United States Patent
Issaev et al.

(10) Patent No.: US 8,920,969 B2
(45) Date of Patent: Dec. 30, 2014

(54) ALKALINE ELECTROCHEMICAL CELLS WITH SEPARATOR AND ELECTROLYTE COMBINATION

(71) Applicants: Nikolai Nikolaevich Issaev, Woodbridge, CT (US); James Joseph Cervera, Sandy Hook, CT (US); Michael Pozin, Brookfield, CT (US)

(72) Inventors: Nikolai Nikolaevich Issaev, Woodbridge, CT (US); James Joseph Cervera, Sandy Hook, CT (US); Michael Pozin, Brookfield, CT (US)

(73) Assignee: The Gillette Company, Boston, MA (US)

( * ) Notice: Subject to any disclaimer, the term of this patent is extended or adjusted under 35 U.S.C. 154(b) by 57 days.

(21) Appl. No.: 13/705,400

(22) Filed: Dec. 5, 2012

(65) Prior Publication Data

US 2014/0154542 A1 Jun. 5, 2014

(51) Int. Cl.
| | |
|---|---|
| *H01M 6/04* | (2006.01) |
| *H01M 10/26* | (2006.01) |
| *H01M 2/14* | (2006.01) |
| *H01M 4/42* | (2006.01) |
| *H01M 4/50* | (2010.01) |
| *H01M 2/16* | (2006.01) |

(52) U.S. Cl.
CPC ............... *H01M 6/045* (2013.01); *H01M 10/26* (2013.01); *H01M 2/14* (2013.01); *H01M 4/42* (2013.01); *H01M 4/50* (2013.01); *H01M 2/162* (2013.01); *Y02E 60/124* (2013.01)
USPC .............. 429/206; 429/90; 429/224; 429/229

(58) Field of Classification Search
USPC ........ 429/218.1, 219, 224, 223, 90, 206, 207, 429/229
See application file for complete search history.

(56) References Cited

U.S. PATENT DOCUMENTS

| | | | |
|---|---|---|---|
| 4,238,554 | A | 12/1980 | Barrella |
| 4,482,615 | A | 11/1984 | Rosansky et al. |
| 4,654,280 | A | 3/1987 | Bailey |
| 4,808,497 | A | 2/1989 | Blomgren et al. |
| 4,952,330 | A | 8/1990 | Leger et al. |
| 5,219,683 | A | 6/1993 | Webber |
| 5,290,414 | A | 3/1994 | Marple |
| 5,366,832 | A | 11/1994 | Hayashi et al. |
| 5,458,997 | A | 10/1995 | Crespi et al. |
| 5,514,491 | A | 5/1996 | Webber |
| 5,691,083 | A | 11/1997 | Bolster |

(Continued)

FOREIGN PATENT DOCUMENTS

| | | |
|---|---|---|
| CN | 1645651 A | 7/2005 |
| CN | 1845364 A | 10/2006 |

(Continued)

OTHER PUBLICATIONS

PCT International Search Report with Written Opinion in corresponding Int'l appln. PCT/US2013/073235 dated Apr. 2, 2014.

*Primary Examiner* — Mark F Huff
*Assistant Examiner* — Monique Wills
(74) *Attorney, Agent, or Firm* — Leo J. White; Steven W. Miller

(57) ABSTRACT

An alkaline electrochemical cell having an anode including electrochemically active anode material, a cathode including electrochemically active cathode material, a separator between the anode and the cathode, and an electrolyte. The electrolyte includes a hydroxide dissolved in water. The separator in combination with the electrolyte has an initial area-specific resistance between about 100 mOhm-cm$^2$ and about 220 mOhm-cm$^2$.

16 Claims, 2 Drawing Sheets

(56) References Cited

U.S. PATENT DOCUMENTS

| | | | |
|---|---|---|---|
| 6,156,450 A * | 12/2000 | Bailey | 429/93 |
| 6,171,729 B1 | 1/2001 | Gan et al. | |
| 6,218,054 B1 | 4/2001 | Webber | |
| 6,300,004 B1 | 10/2001 | Tucholski | |
| 6,627,353 B1 | 9/2003 | Munshi | |
| 6,670,073 B2 | 12/2003 | Tucholski et al. | |
| RE38,518 E | 5/2004 | Tucholski | |
| 6,730,136 B2 | 5/2004 | Webber | |
| 6,849,360 B2 | 2/2005 | Marple | |
| 7,157,185 B2 | 1/2007 | Marple | |
| 8,119,286 B2 | 2/2012 | Issaev et al. | |
| 2003/0070283 A1 | 4/2003 | Webber | |
| 2003/0170537 A1 | 9/2003 | Randell | |
| 2003/0228518 A1 | 12/2003 | Marple | |
| 2004/0029007 A1 | 2/2004 | Kusumoto et al. | |
| 2005/0095508 A1 | 5/2005 | Yamamoto | |
| 2005/0112462 A1 | 5/2005 | Marple | |
| 2005/0233214 A1 | 10/2005 | Marple et al. | |
| 2005/0277023 A1 | 12/2005 | Marple et al. | |
| 2006/0046152 A1 | 3/2006 | Webber | |
| 2006/0046153 A1 | 3/2006 | Webber | |
| 2006/0046154 A1 | 3/2006 | Webber et al. | |
| 2008/0076029 A1 | 3/2008 | Bowden et al. | |
| 2009/0098462 A1* | 4/2009 | Fujiwara et al. | 429/223 |
| 2009/0148756 A1 | 6/2009 | Specht et al. | |
| 2009/0214950 A1 | 8/2009 | Bowden et al. | |
| 2009/0263727 A1 | 10/2009 | Josephs et al. | |
| 2009/0297949 A1 | 12/2009 | Berkowitz et al. | |
| 2011/0123874 A1 | 5/2011 | Issaev et al. | |
| 2012/0021266 A1 | 1/2012 | Marple et al. | |
| 2012/0183862 A1* | 7/2012 | Gupta et al. | 429/254 |
| 2013/0183568 A1 | 7/2013 | Babinec et al. | |

FOREIGN PATENT DOCUMENTS

| | | |
|---|---|---|
| JP | 2006-100164 | 4/2006 |
| JP | 2007042447 A | 2/2007 |
| JP | 2007052935 A | 3/2007 |

* cited by examiner

ALKALINE ELECTROCHEMICAL CELLS WITH SEPARATOR AND ELECTROLYTE COMBINATION

FIELD OF THE INVENTION

The invention relates to an alkaline electrochemical cell.

BACKGROUND OF THE INVENTION

Electrochemical cells, or batteries, are commonly used as electrical energy sources. A battery contains a negative electrode, typically called the anode, and a positive electrode, typically called the cathode. The anode contains an active material that can be oxidized. The cathode contains or consumes an active material that can be reduced. The anode active material is capable of reducing the cathode active material. A separator is disposed between the anode and cathode. These components are disposed in a metal can.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

There is a growing need to make batteries better suitable to power contemporary electronic devices such as toys; remote controls; audio devices; flashlights; digital cameras and peripheral photography equipment; electronic games; toothbrushes; radios; and clocks. It is also desirable for batteries to have a long service life. There exists a need to provide an alkaline electrolyte solution and separator combination for use in a battery to provide lower overall battery impedance to substantially increase overall battery performance, such as power capability and service life.

SUMMARY OF THE INVENTION

The invention is directed to an alkaline electrochemical cell comprising an anode, a cathode, a separator between said anode and said cathode, and an electrolyte. The anode comprises electrochemically active anode material. The cathode comprises electrochemically active cathode material. The electrolyte comprises a hydroxide dissolved in water. The separator in combination with the electrolyte has an initial area specific resistance between about 100 mOhm-cm$^2$ and about 220 mOhm-cm$^2$.

BRIEF DESCRIPTION OF THE DRAWINGS

While the specification concludes with claims particularly pointing out and distinctly claiming the subject matter, which is regarded as forming the present invention, it is believed that the invention will be better understood from the following description taken in conjunction with the accompanying drawings.

DETAILED DESCRIPTION OF THE INVENTION

Electrochemical cells, or batteries, may be primary or secondary. Primary batteries are meant to be discharged, e.g., to exhaustion, only once and then discarded. Primary batteries are described, for example, in David Linden, Handbook of Batteries (McGraw-Hill, 2d ed. 1995). Secondary batteries are intended to be recharged. Secondary batteries may be discharged and then recharged many, e.g., more than fifty times, a hundred times, or more, times. Secondary batteries are described, e.g., in Falk & Salkind, "Alkaline Storage Batteries", John Wiley & Sons, Inc. 1969; U.S. Pat. No. 345,124; and French Patent No. 164,681, all hereby incorporated by reference. Accordingly, batteries may include various electrochemical couples and electrolyte combinations. Although the description and examples provided herein are directed towards primary alkaline electrochemical cells, batteries, it should be appreciated that the invention applies to both primary and secondary alkaline batteries and both primary and secondary alkaline batteries, regardless of their embodiments, are within the scope of this application. is not limited to such an embodiment.

Figure 1:
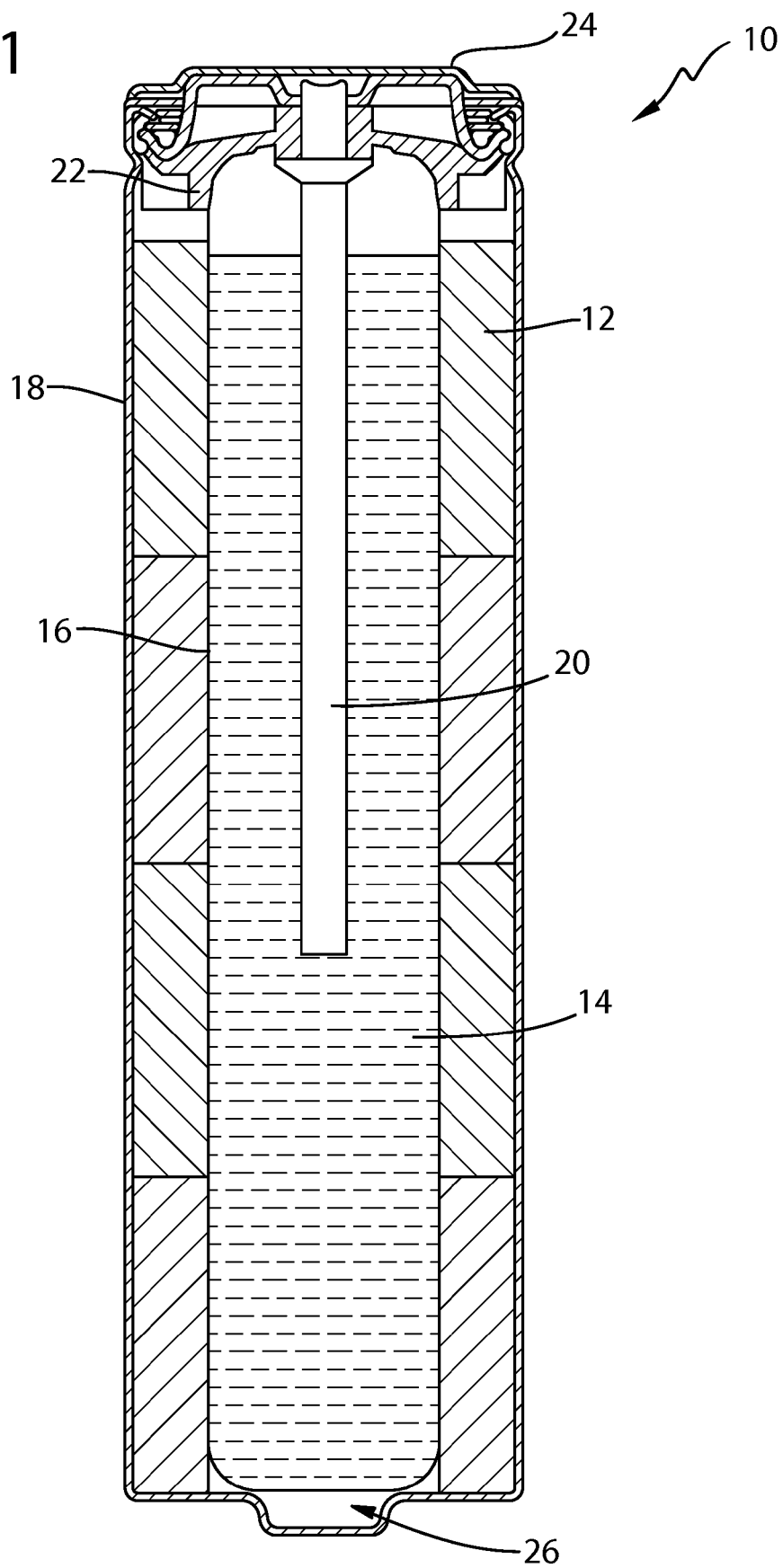
FIG. 1 is a cross-section of an electrochemical cell of the present invention.

Referring to FIG. 1, an alkaline electrochemical cell, or battery, 10 includes a cathode 12, an anode 14, a separator 16 and a housing 18. Battery 10 also includes current collector 20, seal 22, and a negative metal end cap 24, which serves as the negative terminal for the battery 10. A positive pip 26, which serves the positive terminal of the cell, is at the opposite end of the battery 10 from the negative metal end cap 24. An electrolytic solution (not shown) is dispersed throughout the battery 10. Battery 10 can be, for example, a AA, AAA, AAAA, C, or D alkaline battery.

The housing 18 can be of any conventional type commonly used in primary alkaline batteries and can be made of any suitable material, such as, e.g., nickel-plated cold-rolled steel or plastic. The seal 22 may be made of, for example, a polyamide (Nylon). The housing 18 may have a conventional cylindrical shape—or may have any other suitable non-cylindrical, e.g., prismatic, shape. Interior walls of the housing 18 may be treated with a material that has low electrical-contact resistance to an electrode. The interior walls of the housing 18 may be plated, e.g., with nickel, cobalt, or painted with a carbon-loaded paint.

The current collector 20 may be made of metal, e.g., zinc, copper, brass, or any other suitable material. The current collector 20 may be optionally plated with tin, zinc, bismuth, indium, or another suitable material presenting a low electrical-contact resistance between the current collector 20 and, for example, the anode 14.

Cathode 12 includes one or more electrochemically active cathode materials. The electrochemically active cathode material may include manganese oxide, manganese dioxide, electrolytic manganese dioxide (EMD), chemical manganese dioxide (CMD), high power electrolytic manganese dioxide (HP EMD), lambda manganese dioxide, and mixtures thereof. Other electrochemically active cathode materials include, but are not limited to, silver oxide, nickel oxide, nickel oxyhydroxide, copper oxide, bismuth oxide, high-valence nickel, alloys thereof, and mixtures thereof. The nickel oxide can include nickel oxyhydroxide, cobalt oxyhydroxide-coated nickel oxyhydroxide, delithiated layered lithium nickel oxide, and combinations thereof. The nickel oxyhydroxide can include beta-nickel oxyhydroxide, gamma-nickel oxyhydroxide, and/or intergrowths of beta-nickel oxyhydroxide and/or gamma-nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel Oxyhydroxide and gamma-nickel oxyhydroxide. The nickel oxide can include a partially delithiated layered nickel oxide having the general chemical formula $Li_{1-x}H_yNiO_2$, wherein $0.1 \leq x \leq 0.9$ and $0.1 \leq y \leq 0.9$. The high-valence nickel may, for example, include tetravalent nickel.

A preferred electrochemically active cathode material is manganese dioxide, having a purity of at least about 91 percent by weight. Electrolytic manganese dioxide (EMD) is a preferred form of manganese dioxide for electrochemical cells because of its high density and since it is conveniently obtained at high purity by electrolytic methods. Chemical manganese dioxide (CMD), a chemically synthesized manganese dioxide, has also been used as electrochemically active cathode material in electrochemical cells including alkaline cells and heavy-duty cells.

EMD is typically manufactured from direct electrolysis of a bath of manganese sulfate and sulfuric acid. Processes for the manufacture of EMD and its properties appear in Batteries, edited by Karl V. Kordesch, Marcel Dekker, Inc., New York, Vol. 1, (1974), p. 433-488. CMD is typically made by a process known in the art as the "Sedema process," a chemical process disclosed by U.S. Pat. No. 2,956,860 (Welsh). Battery-grade $MnO_2$ may be produced via the Sedema process by employing the reaction mixture of $MnSO_4$ and an alkali metal chlorate, preferably $NaClO_3$. Distributors of manganese dioxides include Tronox, Erachem, Tosoh, Delta Manganese, and Xiangtan.

In batteries where very low or no cell distortion is required, high power (HP) EMD may be used. Preferably, the HP EMD has an open circuit voltage (OCV) of at least 1.635. A suitable HP EMD is commercially available from Tronox, under the trade name High Drain.

The cathode 12 may also include carbon particles and a binder. The cathode 12 may also include other additives. The cathode 12 will have a porosity. The cathode porosity is preferably between about 22% and about 31%. The cathode porosity is calculated at the time of manufacturing by the following formula:

% Cathode Porosity=(1−(cathode solids volume÷cathode volume))×100

The porosity of the cathode is typically calculated at the time of manufacturing since the porosity will change over time due to cathode swelling associated with electrolyte wetting of the cathode and battery discharge.

The carbon particles are included in the cathode to allow the electrons to flow through the cathode. The carbon particles may be graphite, such as expanded graphite and natural graphite. It is preferred that the amount of carbon particles in the cathode is relatively low, e.g., less than 3.75%, or even less than 3.5%, for example 2.0% to 3.5%. A lower carbon level enables inclusion of a higher level of active material within the cathode without increasing the volume of the cell or reducing the void volume (which must be maintained at or above a certain level to prevent internal pressure from rising too high as gas is generated within the cell). A suitable expanded graphite can be obtained, for example, from Timcal.

Some preferred cells contain from about 2% to about 3.5% expanded graphite by weight. In some implementations, this allows the level of EMD to be from about 89% to 91% by weight as supplied. (EMD contains about 1-1.5% moisture as supplied, so this range equates to about 88% to 90% pure EMD.) Preferably, the ratio of cathode active material to expanded graphite is greater than 25, and more preferably greater than 26 or even greater than 27. In some implementations, the ratio is between 25 and 33, e.g., between 27 and 30. These ratios are determined by analysis, ignoring any water.

It is generally preferred that the cathode be substantially free of unexpanded graphite. While unexpanded graphite particles provide lubricity to the cathode forming equipment, this type of graphite is significantly less conductive than expanded graphite, and thus it is necessary to use more in order to obtain the same cathode conductivity. While not preferred, the cathode may include low levels of unexpanded graphite, however this will compromise the reduction in graphite concentration that can be obtained while maintaining a particular cathode conductivity.

The cathode may be provided in the form of pressed pellets. For optimal processing, it is generally preferred that the cathode have a moisture level in the range of about 2.5% to about 5%, more preferably about 2.8% to about 4.6%. It is also generally preferred that the cathode have a porosity of from about 22% to about 31%, for a good balance of manufacturability, energy density, and integrity of the cathode.

Examples of binders that may be used in the cathode include polyethylene, polyacrylic acid, or a fluorocarbon resin, such as PVDF or PTFE. An example of a polyethylene binder is sold under the trade name COATHYLENE HA-1681 (available from Hoechst or DuPont).

Examples of other cathode additives are described in, for example, U.S. Pat. Nos. 5,698,315, 5,919,598, and 5,997,775 and U.S. application Ser. No. 10/765,569.

The amount of electrochemically active cathode material within the cathode 12 may be referred to as the cathode loading. The loading of the cathode 12 may vary depending upon the electrochemically active cathode material used within, and the cell size of, the battery 10. For example, AA batteries with a manganese dioxide electrochemically active cathode material may have a cathode loading of at least 10.0 grams of manganese dioxide. The cathode loading may be, for example, at least about 10.5 grams of manganese dioxide. The cathode loading may be, for example, between about 10.7 grams and about 11.5 grams of manganese dioxide. The cathode loading may be from about 10.7 grams and about 11.0 grams of manganese dioxide. The cathode loading may be from about 10.8 grams and about 11.2 grams of manganese dioxide. The cathode loading may be from about 10.9 grams and about 11.5 grams of manganese dioxide. For a AAA battery, the cathode loading may be from about 4.0 grams and about 6.0 grams of manganese dioxide. For a AAAA battery, the cathode loading may be from about 2.0 grams and about 3.0 grams of manganese dioxide. For a C battery, the cathode loading may be from about 25.0 grams and about 29.0 grams of manganese dioxide. For a D battery, the cathode loading may be from about 54.0 grams and about 70.0 grams of manganese dioxide.

Anode 14 can be formed of at least one electrochemically active anode material, a gelling agent, and minor amounts of additives, such as gassing inhibitor. The electrochemically active anode material may include zinc; cadmium; iron; metal hydride, such as $AB_5$, $AB_2$, and $A_2B_7$; alloys thereof; and mixtures thereof.

The amount of electrochemically active anode material within the anode 14 may be referred to as the anode loading. The loading of the anode 14 may vary depending upon the electrochemically active anode material used within, and the cell size of, the battery 10. For example, AA batteries with a zinc electrochemically active anode material may have an anode loading of at least about 3.3 grams of zinc. The anode loading may be, for example, at least about 4.0, about 4.3, about 4.6 grams, about 5.0 grams, or about 5.5 grams of zinc. AAA batteries, for example, with a zinc electrochemically active anode material may have an anode loading of at least about 1.9 grams of zinc. For example, the anode loading may have at least about 2.0 or about 2.1 grams of zinc. AAAA batteries, for example, with a zinc electrochemically active anode material may have an anode loading of at least about 0.6 grams of zinc. For example, the anode loading may have at least about 0.7 to about 1.0 grams of zinc. C batteries, for example, with a zinc electrochemically active anode material may have an anode loading of at least about 9.5 grams of zinc. For example, the anode loading may have at least about 10.0 to about 15.0 grams of zinc. D batteries, for example, with a zinc electrochemically active anode material may have an anode loading of at least about 19.5 grams of zinc. For example, the anode loading may have at least about 20.0 to about 30.0 grams of zinc.

Examples of a gelling agent that may be used include a polyacrylic acid; a grafted starch material; a salt of a polyacrylic acid; a carboxymethylcellulose; a salt of a carboxymethylcellulose (e.g., sodium carboxymethylcellulose); or combinations thereof. The anode may include a gassing inhibitor that may include an inorganic material, such as bismuth, tin, or indium. Alternatively, the gassing inhibitor can include an organic compound, such as a phosphate ester, an ionic surfactant or a nonionic surfactant.

An electrolyte may be dispersed throughout the cathode 12, the anode 14 and the separator 16. The electrolyte comprises an ionically conductive component in an aqueous solution. The ionically conductive component may be a hydroxide. The hydroxide may be, for example, sodium hydroxide, potassium hydroxide, lithium hydroxide, cesium hydroxide, and mixtures thereof. The ionically conductive component may also include a salt. The salt may be, for example, zinc chloride, ammonium chloride, magnesium perchlorate, magnesium bromide, and mixtures thereof. The concentration of the ionically conductive component may be selected depending on the battery design and its desired performance. An aqueous alkaline electrolyte may include a hydroxide, as the ionically conductive component, in a solution with water. The concentration of the hydroxide within the electrolyte may be from about 0.25 to about 0.35, or from about 25% to about 35%, on a total weight basis of the electrolyte. For example, the hydroxide concentration of the electrolyte may be from about 0.25 to about 0.32, or from about 25% to about 32%, on a total weight basis of the electrolyte.

The concentration of the ionically conductive component may be determined by collecting the total amount of electrolyte from within an assembled alkaline cell, for example a AA or a AAA alkaline cell. Removing the separator, cathode, and anode components and dissolving these components within a hydrochloric solution may generally accomplish this. Hydrogen peroxide may be added in a drop-wise manner to aid in the dissolving process. The dissolved solution may then be diluted to a specific volume to provide an analyte. The analyte may then be analyzed via an inductively coupled plasma (ICP) emission spectrometer, such as a JY Ultratrace or its equivalent, to determine the total positive ion concentration of the ionically conductive component within the analyte, for example potassium ($K^+$) concentration in ppm. The total positive ion concentration determined via ICP from the analyte may be used to mathematically determine the total weight of the positive ion, for example potassium ($K^+$) in grams, and subsequently the total weight of ionically conductive component, for example potassium hydroxide (KOH) in grams, within the electrolyte solution of the sampled alkaline cell. The concentration of the ionically conductive component of the electrolyte, for example potassium hydroxide (KOH), on a weight basis of the electrolyte may be determined by dividing the total weight of the ionically conductive component by the analyte weight.

The aqueous alkaline electrolyte may also include zinc oxide (ZnO). The ZnO may serve to suppress zinc corrosion within the anode. The concentration of ZnO included within the electrolyte may be less than about 3% by weight of the electrolyte. The ZnO concentration, for example, may be less than about 2% by weight of the electrolyte.

The total weight of the aqueous alkaline electrolyte within a AA alkaline battery, for example, may be from about 3.0 grams to about 4.0 grams. The weight of the electrolyte within a AA battery preferably may be, for example, from about 3.3 grams to about 3.8 grams. The weight of the electrolyte within a AA battery may more preferably, for example, from about 3.4 grams to about 3.6 grams. The total weight of the aqueous alkaline electrolyte within a AAA alkaline battery, for example, may be from about 1.0 grams to about 2.0 grams. The weight of the electrolyte within a AAA battery preferably may be, for example, from about 1.2 grams to about 1.8 grams. The weight of the electrolyte within a AA battery may more preferably, for example, from about 1.4 grams to about 1.6 grams.

It has been found that in addition to the electrolyte a low resistance separator may facilitate optimal discharge performance of an assembled alkaline electrochemical cell. Separator 16 comprises a material that is wettable or wetted by the electrolyte. A material is said to be wetted by a liquid when the contact angle between the liquid and the surface is less than 90° or when the liquid tends to spread spontaneously across the surface; both conditions normally coexist. Separator 16 may comprise woven or nonwoven paper or fabric. Separator 16 may include a layer of, for example, cellophane combined with a layer of non-woven material. The separator also can include an additional layer of non-woven material. The separator material may be thin. The separator, for example, may have a dry thickness of less than 150 micrometers (microns). The separator, for example, may have a dry thickness of less than 100 microns. The separator preferably has a dry thickness from about 70 microns to about 90 microns, more preferably from about 70 microns to about 75 microns. The separator has a basis weight of 40 g/m$^2$ or less. The separator preferably has a basis weight from about, 15 g/m$^2$ to about 40 g/m$^2$, and more preferably from about 20 g/m$^2$ to about 30 g/m$^2$.

Separator 16 may have an air permeability value. The air permeability value of a separator may be characterized by the Sodim air permeability tester, as defined in ISO 2965. The Sodim air permeability tester is designed to measure the air permeability of papers and non-woven materials. The tester measures the volume of gas that passes, at a pressure of 1 kPa, through a predetermined cross-section of the material during one minute. The air permeability value of Separator 16 may be from about 2000 cm$^3$/cm$^2$·min @ 1 kPa to about 5000 cm$^3$/cm$^2$·min @ 1 kPa. The air permeability value of Separator 16 may be from about 3000 cm$^3$/cm$^2$·min @ 1 kPa to about 4000 cm$^3$/cm$^2$·min @ 1 kPa. The air permeability value of Separator 16 may be from about 3500 cm$^3$/cm$^2$·min @ 1 kPa to about 3800 cm$^3$/cm$^2$·min @ 1 kPa.

The overall chemical reaction for the reduction of the anode and oxidation of the cathode in the primary alkaline electrochemical cell, or battery, may be represented by Reaction (I) below.

$$Zn + 2MnO_2 + H_2O \rightarrow ZnO + 2MnOOH \tag{I}$$

Although the manganese compound is shown as $MnO_2$, as is conventional, it is well understood by those skilled in the art that manganese dioxide is non-stoichiometric, and the actual chemical formula for manganese dioxide is approximately $MnO_{1.96}$. Accordingly, the actual number of electrons involved in this reaction is approximately 0.925. This is referred to herein, as is also conventional, as the 1-electron step.

The 1-electron step, as represented by Reaction (I) above, is not necessarily the only reaction to occur. The 1-electron step may be followed by a second electron reaction, referred to as the $2^{nd}$-electron step, where the MnOOH is converted to $Mn(OH)_2$. This second reaction is usually only significant where a battery has been discharged to a significant degree. The $2^{nd}$-electron step appears to have very little, or no, contribution on the overall discharge of the battery. Thus, for the calculations herein, only the 1-electron step is taken into account. Any references herein to the "point of completion" mean the point at which the 1-electron step, or 0.925 electrons in stoichiometric terms, has gone to completion (i.e., $Mn^{+3.925}$ is reduced to $Mn^{+3.0}$).

It can be seen from the above Reaction (I) that there must be sufficient water present to allow the reaction to go sufficiently to completion to be considered full discharge. The aqueous alkaline electrolyte is the source of water within the battery prior to discharge. The concentration of the hydroxide within the electrolyte prior to discharge, which may be referred to as the initial hydroxide concentration, must be sufficient to support Reaction (I). In addition, the concentration of the hydroxide within the electrolyte will change with the discharge of the battery. The concentration of the hydroxide within the electrolyte at the end of discharge may be referred to as the final hydroxide concentration. The final hydroxide concentration may be calculated for a given battery design based on the weight of manganese dioxide within the cathode; the initial hydroxide concentration; and the volume of electrolyte under the assumption that at the end of 1-electron discharge electrolyte is saturated by zincate ions. The values of zincate concentration in saturated electrolyte solutions may be found within, for example, *The Primary Battery*, George W. Heise and N. Corey Cahoon, Eds., John Wiley & Sons, Inc. (1971).

In practice, calculating the final KOH concentration, based on this principle, means that it is neither necessary to discharge a cell by 1-electron, nor to measure final KOH concentration, whether in the anode, cathode, or both. Accordingly, preferred cells can be designed and manufactured with considerable ease, as starting amounts of active materials are readily assembled and adjusted to yield a suitable, final, calculated concentration of KOH at 1-electron discharge.

Similar considerations also apply to the concentration of KOH at the beginning, before the cell has been discharged. Reaction (I) shows that the electrode reaction consumes one molecule of water for every two molecules of manganese dioxide consumed. However, a different reaction applies much below about 36% KOH and the reaction scheme changes to:

$$Zn + 2MnO_2 + 2H_2O \rightarrow Zn(OH)_2 + 2MnOOH \quad (II)$$

The final KOH concentration (i.e., at the end of the 1-electron discharge) is calculated based on the assumption that all of the $MnO_2$ is discharged to MnOOH.

The overall primary alkaline battery reaction that applies is dependent on the average initial KOH concentration within the electrolyte:

$$Zn + 2MnO_2 + H_2O \rightarrow ZnO + 2MnOOH \quad (I)$$

$$Zn + 2MnO_2 + 2H_2O \rightarrow Zn(OH)_2 + 2MnOOH \quad (II)$$

The calculations herein assume only Reaction (I) will occur when the alkaline electrolyte has an initial normality that is greater than or equal to 8N. The calculations also assume that only Reaction II will occur when the alkaline electrolyte has an initial normality of less than or equal to 6N. It is also assumed that the change from Reaction (I) to Reaction (II) occurs linearly for the alkaline electrolyte solution with a normality between 6N and 8N. It will also be appreciated that the exact initial KOH concentration upon which the 8N and 6N calculations are based will depend on any additives dissolved within the electrolyte, such as ZnO.

The initial hydroxide concentration of the electrolyte may be from about 0.25 to about 0.35, or from about 25% to about 35%, on a total weight basis of the electrolyte. For example, the initial hydroxide concentration of the electrolyte may be from about 0.25 to about 0.32, or from about 25% to about 32%, on a total weight basis of the electrolyte. The final hydroxide concentration of the electrolyte may be from about 0.40 to about 0.55, or from about 40% to about 55%, on a total weight basis of the electrolyte. For example, the final hydroxide concentration of the electrolyte may be from about 0.46 to about 0.54, or from about 46% to about 54%, on a total weight basis of the electrolyte. For example, the final hydroxide concentration of the electrolyte may be from about 0.40 to about 0.49, or from about 40% to about 49%, on a total weight basis of the electrolyte.

Area-specific resistance is a measured property of the combined separator and electrolyte that is influenced by separator properties, such as composition, thickness, air permeability, basis weight, and wettability, along with electrolyte properties, such as hydroxide and zincate concentration. The area-specific resistance value may be the best parameter to correlate with predictable alkaline electrochemical cell performance.

The area-specific resistance of an alkaline electrochemical cell may be determined both before and after the electron discharge step. The area-specific resistance of the cell prior to the 1-electron discharge may be referred to as the initial area-specific resistance. The cell with desired discharge performance characteristics may have an initial area-specific resistance value from about 100 mOhm-cm$^2$ to about 220 mOhm-cm$^2$. The initial area-specific resistance may be from about 150 mOhm-cm$^2$ to about 200 mOhm-cm$^2$.

The area-specific resistance of an alkaline battery after the 1-electron discharge may be referred to as the final area-specific resistance. An alkaline electrochemical cell with desired discharge performance characteristics may have a final area-specific resistance value of less than about 500 mOhm-cm$^2$. The final area-specific resistance may be from about 200 mOhm-cm$^2$ to about 500 mOhm-cm$^2$. The final area-specific resistance may be from about 250 mOhm-cm$^2$ to about 350 mOhm-cm$^2$. The final area-specific resistance may be from about 280 mOhm-cm$^2$ to about 340 mOhm-cm$^2$. The final area-specific resistance may be from about 300 mOhm-cm$^2$ to about 330 mOhm-cm$^2$.

The ratio of the initial area-specific resistance to the final area-specific resistance may be referred to as the ASR ratio and is useful in predicting overall battery performance including a separator and electrolyte combination. A separator and electrolyte combination may have an acceptable initial ASR value that may mistakenly indicate a battery including such a separator and electrolyte combination would perform acceptably. As discussed above, the concentration of the hydroxide within the electrolyte will be dynamic during the discharge of the battery. The separator and electrolyte combination must also have an acceptable ASR value at the end of discharge. It is conceivable that a separator and electrolyte combination with a low initial area-specific resistance may have a high area-specific resistance value at the end of discharge. The ASR ratio may help to better select a separator and electrolyte combination for an alkaline electrochemical cell. An alkaline electrochemical cell with desired discharge performance characteristics may have an ASR ratio of less than about 1.9. For example, the ASR ratio may be less than about 1.7. For example, the ASR ratio may be from about 1.2 to about 1.65.

Figure 2:
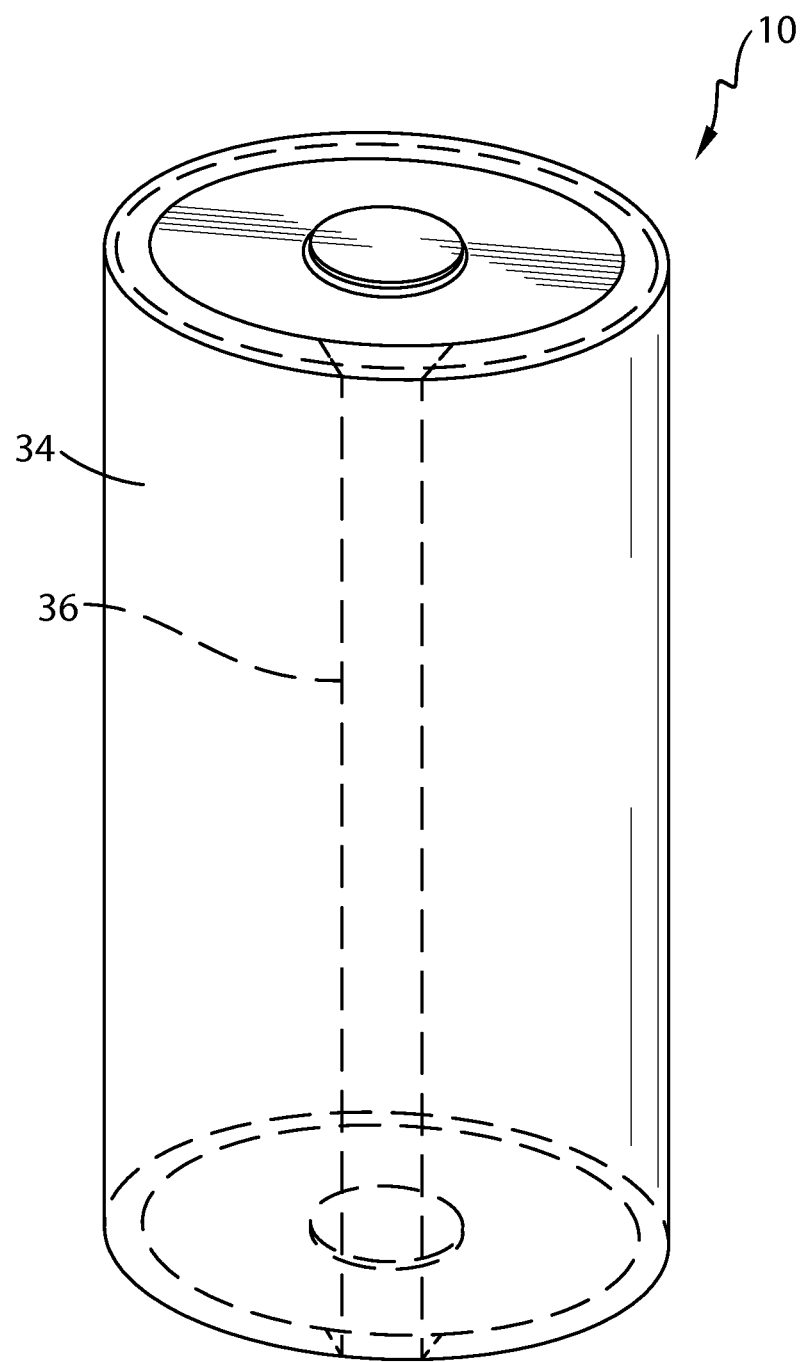
FIG. 2 is another view of the electrochemical cell of the present invention.

Referring to FIG. 2, a battery 10 is shown including a label 34 that has a voltage indicator, or tester, 36 incorporated within it. The label 34 may be a laminated multi-layer film with a transparent or translucent layer bearing the label graphics and text. The label 34 may be made from polyvinyl chloride (PVC), polyethylene terephthalate (PET), and other similar polymer materials. Known types of voltage testers that are placed on batteries may include thermochromic and electrochromic indicators. In a thermochromic battery tester the indicator may be placed between the anode and cathode electrodes of the battery. The consumer activates the indicator by manually depressing a switch. Once the switch is depressed, the consumer has connected an anode of the battery to a cathode of the battery through the thermochromic tester. The thermochromic tester may include a silver conductor that has a variable width so that the resistance of the conductor also varies along its length. The current generates heat that changes the color of a thermochromic ink display that is over the silver conductor as the current travels through the silver conductor. The thermochromic ink display may be arranged as a gauge to indicate the relative capacity of the battery. The higher the current the more heat is generated and the more the gauge will change to indicate that the battery is good.

Experimental Testing

Resistivity Cell Measurements

Resistance measurements are conducted in a resistivity cell at room temperature, e.g., about 21° C. The resistivity cell consists of two stainless steel electrodes encased in Teflon®. The lower electrode is constructed such that a small reservoir of electrolyte may be maintained in the cell. The top electrode assembly is removable and is aligned to the bottom assembly via two metal pins. The top electrode assembly is spring loaded so that that force may be applied (approximately 4 to 5 lbs.) to the top of a material sample being analyzed. The lower electrode assembly is screwed to a fixture base and electrical leads are attached to each electrode. The leads are then attached to the leads of an impedance analyzer, such as a Solartron Impedance Analyzer, that is used to complete impedance sweeps to determine resistances of the cell or sample materials.

The background resistance of the resistivity cell is determined by running an impedance sweep on the fixture filled with electrolyte when its electrodes are shorted. The sweep starts at 100,000 kHz and finishes at 100 Hz using a 10 mV amplitude, using the software program ZPlot by Scribner Instruments to control the instrumentation. The resistance of the fixture ($R_{CELL}$) may have typical values between about 10 and 150 mΩ depending upon the condition of the stainless steel electrodes. Several sweeps may be completed to ensure the value obtained is relatively constant.

The resistance of the separator and electrolyte combination is determined by running an impedance sweep on a separator sample. The fixture includes a center disk upon which the separator sample may be placed. Electrolyte is placed within the cavity of the resistivity cell to a level that ensures the separator sample is well-wetted on both sides for 1 minute. The same impedance sweep as described above is run. Again, several sweeps may be completed to ensure the value obtained is relatively consistent. The data obtained from the sweeps is plotted on a Nyquist plot. The ohmic resistance ($R_{REAL}$) of the separator and electrolyte combination is determined at the Z"=0 point on the Nyquist plot. However, this value includes the resistance of the resistivity cell. By subtracting the resistance value of the resistivity cell ($R_{CELL}$) from the resistance determined for the separator and electrolyte combination sample that includes resistivity cell impedance ($R_{REAL}$), one can calculate the adjusted resistance value for the separator and electrolyte combination [$R_{REAL}$(ADJ)].

The area-specific resistance (ASR) of the separator/electrolyte combination is determined by multiplying the geometrical surface area of the resistivity cell's working electrode by the adjusted separator-electrolyte combination's resistance value. The working electrode surface area of resistivity cell used in these experiments is 3.83 cm$^2$. The units of ASR are mOhm·cm$^2$.

The initial KOH concentration of the aqueous alkaline electrolyte is selected to be 31% by weight of electrolyte and 2% of ZnO by weight of the electrolyte are dissolved in water. The initial weight of the electrolyte is about 3.532 grams. The cathode may include 10.918 grams of manganese dioxide. The final KOH concentration is calculated, as discussed above, to be 50.4% by weight electrolyte with a saturated ZnO content of 9.7%.

Three potential separators for use within an improved alkaline electrochemical cell design are each combined with potassium hydroxide electrolyte solutions at the initial and final KOH concentrations above for ASR screening.

- Separator 1—PDM PAC623, a nonwoven material separator with a basis weight of about 23 g/m$^2$ and thickness of about 75 microns (dry).
- Separator 2—PDM PAK628, a nonwoven material separator with a basis weight of about 28 g/m$^2$ and thickness of about 88 microns (dry).
- Separator 3—DT225, a separator including a cellophane laminated to a nonwoven material with a basis weight of about 57 g/m$^2$ and a thickness of about 90 microns (dry).
- Electrolyte A—A mixture of 31% by weight potassium hydroxide (KOH) and 2% by weight zinc oxide (ZnO) in water.
- Electrolyte B—A mixture of 50.4% by weight potassium hydroxide (KOH) and 9.7% by weight zinc oxide (ZnO) in water.

The impedance of the resistivity cell, at room temperature, is first determined with each specific electrolyte as described above. The impedance of the separator/electrolyte combination, at room temperature, is then determined with each specific electrolyte. The adjusted separator/electrolyte combination resistance is then determined and used in the calculation of the ASR. The results are included within Table 1. The separator/electrolyte combinations that have the lowest initial ASR values, final ASR values, and ASR ratios may provide lower overall cell impedance and potentially improved discharge performance.

TABLE 1

Area-specific resistance (ASR) for separator/electrolyte combinations.

| SEPARATOR | ASR (mOhm · cm$^2$) | | ASR Ratio |
|---|---|---|---|
| | Electrolyte A | Electrolyte B | |
| 1 | 191.96 | 305.94 | 1.594 |
| 2 | 188.77 | 321.51 | 1.703 |
| 3 | 260.63 | 2178.83 | 8.360 |

Performance Testing of Assembled AA Alkaline Primary Batteries

An exemplary battery is assembled to evaluate the effects of the present invention on battery discharge performance.

The anode includes an anode slurry containing 4.8 grams of zinc; 1.843 grams of a potassium hydroxide alkaline electrolyte with about 31% KOH by weight and 2% by ZnO dissolved in water; 0.027 grams of polyacrylic acid gellant; and 0.02 grams of corrosion inhibitor. The cathode includes a blend of EMD, graphite, and potassium hydroxide aqueous electrolyte solution. The cathode includes a loading of 10.918 grams of EMD, a loading of 0.4 grams Timcal BNB-90 graphite, and 0.613 grams of electrolyte. A separator is interposed between the anode and cathode. The anode, cathode, and separator are inserted in a housing that is cylindrical in shape. The housing is then sealed to finish off the battery assembly process. The resulting battery is typically referred to as a AA battery.

Performance testing includes discharge performance testing that may be referred to as the ANSI/IEC Motorized Toys Test (Toy Test). The Toy Test protocol includes applying a constant load of 3.9 Ohms for 1 hour. The battery then rests for a period of 23 hours. This cycle is repeated until the cutoff voltage of 0.8 volts is reached.

Performance testing also includes discharge performance testing that may be referred to as the ANSI/IEC Remote Controls Test (Remote Controls Test). The Remote Controls Test protocol includes applying a constant load of 24 Ohms for 15 seconds per minute for 8 hours. The battery then rests for a period of 16 hours. This cycle is repeated until the cutoff voltage of 1.0 volts is reached.

Performance testing also includes discharge performance testing that may be referred to as the ANSI/IEC Clock/Radio Test (Clock/Radio Test). The Clock/Radio Test protocol includes applying a constant load of 43 Ohms for 4 hours. The battery then rests for a period of 20 hours. This cycle is repeated until the cutoff voltage of 0.9 volts is reached.

Performance Testing

A size AA battery is assembled that includes the combination of Separator 1 and Electrolyte A with an initial ASR of 191.96 mOhm·cm$^2$, final ASR of 305.94 mOhm·cm$^2$, and an ASR ratio of 1.594. The battery is stored at room temperature, e.g., at about 21° C., and then the Remote Control Test is performed on the battery. The battery is stored at room temperature, e.g., at about 21° C., and then the Clock/Radio Test is performed on the battery. The battery is stored at a temperature that cycles from a temperature of 25° C. to 55° C. over a 24-hour period that is repeated for a duration of two weeks and then the Toy Test is performed on the battery.

The battery exhibits an average performance of 8.71 service hours on the Toy Test, an average of 55.2 service hours on the Remote Controls Test, and an average of 105.1 service hours on the Clock/Radio Test. The battery exhibits Toy Test, Remote Controls Test, and Clock/Radio Test performance improvements of about 3.2%, about 4.0%, and about 4.3% respectively, versus a comparative battery that includes a separator/electrolyte combination that has an initial ASR of about 260.63 mOhm·cm$^2$, a final ASR of about 2178.83 mOhm·cm$^2$, and an ASR ratio of 8.36.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An alkaline electrochemical cell comprising an anode including an electrochemically active anode material, a cathode including an electrochemically active cathode material, a separator between said anode and said cathode, and an electrolyte comprising an ionically-conductive component dissolved in water, and the separator in combination with the electrolyte has an initial area-specific resistance between about 100 mOhm-cm$^2$ and about 220 mOhm-cm$^2$; wherein the anode material is selected from the group consisting of zinc, zinc alloys, cadmium, iron, and metal hydride; and the cathode material is selected from the group consisting of manganese oxide, manganese dioxide, electrolytic manganese dioxide (EMD), chemical manganese dioxide (CMD), high power electrolytic manganese dioxide (HP EMD), lambda manganese dioxide, silver oxide, nickel oxide, nickel oxyhydroxide, copper oxide, bismuth oxide, high-valence nickel, and mixtures thereof.

2. The alkaline electrochemical cell of claim 1 wherein initial area-specific resistance is between about 150 mOhm-cm$^2$ and about 200 mOhm-cm$^2$.

3. The alkaline electrochemical cell of claim 1 having a final area-specific resistance less than about 500 mOhm-cm$^2$.

4. The alkaline electrochemical cell of claim 1 having a final area-specific resistance between about 200 mOhm-cm$^2$ and about 500 mOhm-cm$^2$.

5. The alkaline electrochemical cell of claim 1 having an ASR ratio of less than about 1.9.

6. The alkaline electrochemical cell of claim 1 having an ASR ratio from about 1.2 to about 1.65.

7. The alkaline electrochemical cell of claim 1 wherein the ionically conductive component is selected from the group consisting of sodium hydroxide, potassium hydroxide, lithium hydroxide, cesium hydroxide, zinc chloride, ammonium chloride, magnesium perchlorate, magnesium bromide, and mixtures thereof.

8. The alkaline electrochemical cell of claim 1 wherein the separator has an air permeability from about 2000 cm$^3$/cm$^2$·min @ 1 kPa to about about 5000 cm$^3$/cm$^2$·min @ 1 kPa.

9. The alkaline electrochemical cell of claim 1 wherein the separator has a basis weight between about 15 g/m$^2$ and about 40 g/m$^2$.

10. The alkaline electrochemical cell of claim 1 wherein the separator has a dry thickness from about 70 micrometers to about 90 micrometers.

11. The alkaline electrochemical cell of claim 1 wherein the cathode has a loading of about 10.5 grams or more.

12. The alkaline electrochemical cell of claim 1 wherein the cathode has a loading of between about 10.7 grams and about 11.5 grams.

13. The alkaline electrochemical cell of claim 1 wherein the electrolyte has an initial hydroxide concentration from about 25% to about 35%.

14. The alkaline electrochemical cell of claim 1 wherein the electrolyte has an initial hydroxide concentration from about 25% to about 32%.

15. The alkaline electrochemical cell of claim 1 wherein the electrolyte has a final hydroxide concentration from about 40% to about 55%.

16. The alkaline electrochemical cell of claim 1 further comprising a housing and a label affixed to an outer surface of the housing wherein the label includes a voltage tester.

* * * * *